(12) United States Patent
Kondo

(10) Patent No.: US 7,568,847 B2
(45) Date of Patent: Aug. 4, 2009

(54) NOSE PAD FOR CAMERA

(76) Inventor: Takashi Kondo, 104-2 Tsubakikouge, Tsuyama-shi, Okayama-ken (JP) 708-0051

( * ) Notice: Subject to any disclaimer, the term of this patent is extended or adjusted under 35 U.S.C. 154(b) by 281 days.

(21) Appl. No.: 11/812,711

(22) Filed: Jun. 21, 2007

(65) Prior Publication Data

US 2008/0317457 A1    Dec. 25, 2008

(51) Int. Cl.
*G03B 17/00*    (2006.01)
(52) U.S. Cl. ............... 396/421; 396/540; 396/544; 396/661
(58) Field of Classification Search ............ 396/421, 396/544, 540, 661
See application file for complete search history.

(56) References Cited

U.S. PATENT DOCUMENTS

| 2,026,087 | A | * | 12/1935 | Grier | 351/82 |
| 5,943,116 | A | * | 8/1999 | Zeimer | 351/221 |
| 6,217,235 | B1 | * | 4/2001 | Kondo | 396/421 |
| 6,793,413 | B1 | * | 9/2004 | Kondo | 396/421 |

* cited by examiner

*Primary Examiner*—Christopher E Mahoney
*Assistant Examiner*—Linda B Smith
(74) *Attorney, Agent, or Firm*—Manabu Kanesaka

(57) ABSTRACT

A nose pad for camera includes a base plate, at least one projecting portion mounted to the base plate, and a sheet portion mounted to an edge of the base plate at an edge of the sheet portion and extending obliquely upwardly over the base plate and the sheet portion. The projecting portion has an arc shape so that the nose pad can fit a contour of a nose. The sheet portion is designed to have a reasonable space in between the sheet portion and the projecting portion, so that the nose of the user can softly touch the camera when the nose pad is used.

9 Claims, 3 Drawing Sheets

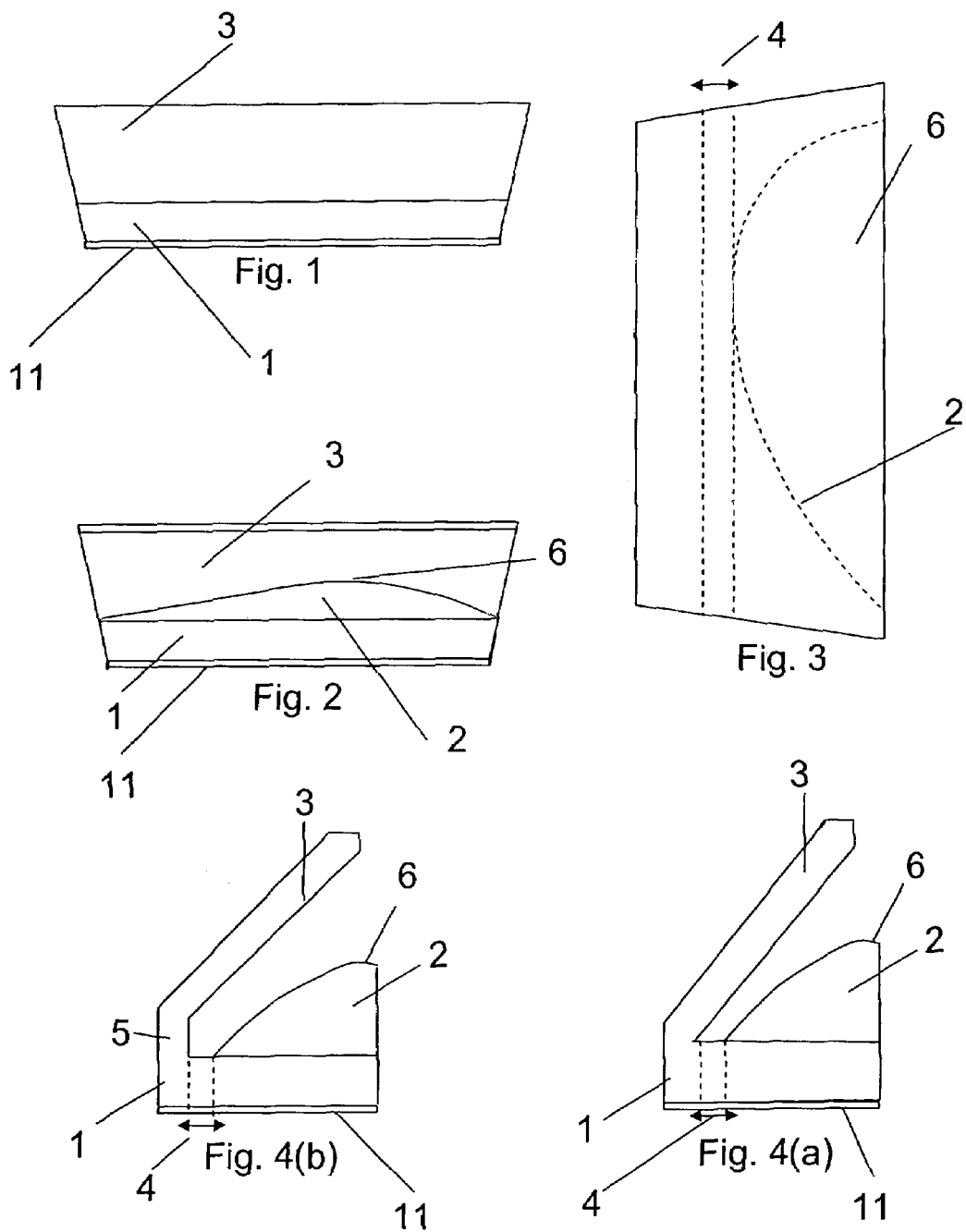

NOSE PAD FOR CAMERA

BACKGROUND OF THE INVENTION AND RELATED ART STATEMENT

The present invention relates to a nose pad to be attached to a camera for stabilizing the camera when the camera is held in a position to take a picture.

Recently, a camera, especially a digital camera, is provided with a large screen for viewing the object to be taken. In this type of camera, a person holding the camera do not need to attach the person's face to the camera.

However, if a picture is to be taken clearly from a long range or in a very close range, it is preferable to see the object through a finder. In this case, the finder is still used.

In using the finder, it is essential to stabilize and hold a camera horizontally for a good quality of picture.

Further, there is a case where a user needs to hold the camera and push a shutter simultaneously to catch an object. In such a case, it is significantly important to hold the camera stably and horizontally and push the shutter in a very short period of time.

In order to help holding the camera stably while watching an object through a finder, a nose pad was invented by the present inventor, i.e. U.S. Pat. No. 6,793,413 and U.S. Design Pat. No. D507,009.

Existing types of nose pads need a plenty of space on the surface of the camera, and it makes it difficult to attach the nose pad to the camera. Also, the existing types of nose pads are designed to directly fit the surface of a nose. Therefore, the surface of the existing nose pads tends to be rigid and unforgiving as far as a capacity to fit various shapes of noses.

In view of above stated issues, the present invention has been made, and an objective is to provide a nose pad for stabilizing and holding a camera horizontally, which can be fixed to various shapes of cameras.

Another objective of the invention is to provide a nose pad which can be used comfortably.

Further objectives and advantages of the invention will be apparent from the following description of the invention.

SUMMARY OF THE INVENTION

In order to achieve the above stated objectives, according to an embodiment of the present invention, a nose pad includes a base plate, a projecting portion disposed on the base plate, and a sheet portion attached at one side thereof to the base plate and located above the projecting portion. The base plate has an elongated flat shape to be attached to the camera.

The projecting portion has a thicker side and a thinner side. In other words, the thicker side is vertically the most elevated area from the base plate. Also, the thicker side is disposed at the upper portion of the nose pad to fit a nose, and the thinner side is disposed at the lower portion to be set on a nose. This particular shape of the projecting portion is designed to be able to fit a curve of a nose and reduce unnecessary movements when a camera is held in a position to take a picture.

In the invention, the projection portion can be either integrally mounted or completely united with the base plate as one unit. An advantage of the mounted type projection portion is that it is very easy to manufacture the nose pads with a variety of shapes and firmnesses of projecting portions by just changing the projecting portions. It would be ideal for the projecting portion to be firmer than the sheet portion to make the most of the basic structure of the nose pad. The ideal materials for the nose pad would be silicon, silicon sponge or the like.

The sheet portion extends obliquely upwardly from one side of the base plate to the other side thereof with a space relative to the projection portion. When the user's nose touches the nose pad, the nose first touches the sheet portion and the sheet portion is pushed onto the projection portion. Thus, the sheet portion helps the nose pad touch the user's nose softly like a cushion. Also, the sheet portion may have a vertical connecting portion, standing on the base plate, to make enough space between the sheet portion and the projecting portion.

In the present invention, for further convenience, an adhesive sheet may be attached on a back side of the base plate of the nose pad to be able to easily attach to the surface of a camera. Optionally, it is suggested that the backside of the nose pad may have an adapter to perfectly fit various different surfaces of cameras such as steps, projections, curves or the like. It is also suggested that the nose pad can be applied for both left and right sides of a nose.

For the above-stated characteristics, the nose pad has a wide utility for various kinds of cameras, such as analog, digital SLR, RF and compact cameras.

However, it is more than advisable to attach the nose pad to the camera and make sure that the nose does not contact other parts of the camera and cause malfunctions before shooting pictures.

BRIEF DESCRIPTION OF THE DRAWINGS

FIG. 1 is a front view of a nose pad.
FIG. 2 is a rear view of the nose pad, shown FIG. 1.
FIG. 3 is a plan view of the nose pad.
FIG. 4(a) is a right side view of the nose pad, and FIG. 4 (b) is a right side view of another embodiment of the nose pad.

DETAILED DESCRIPTION OF PREFERRED EMBODIMENTS

Figure 5A:
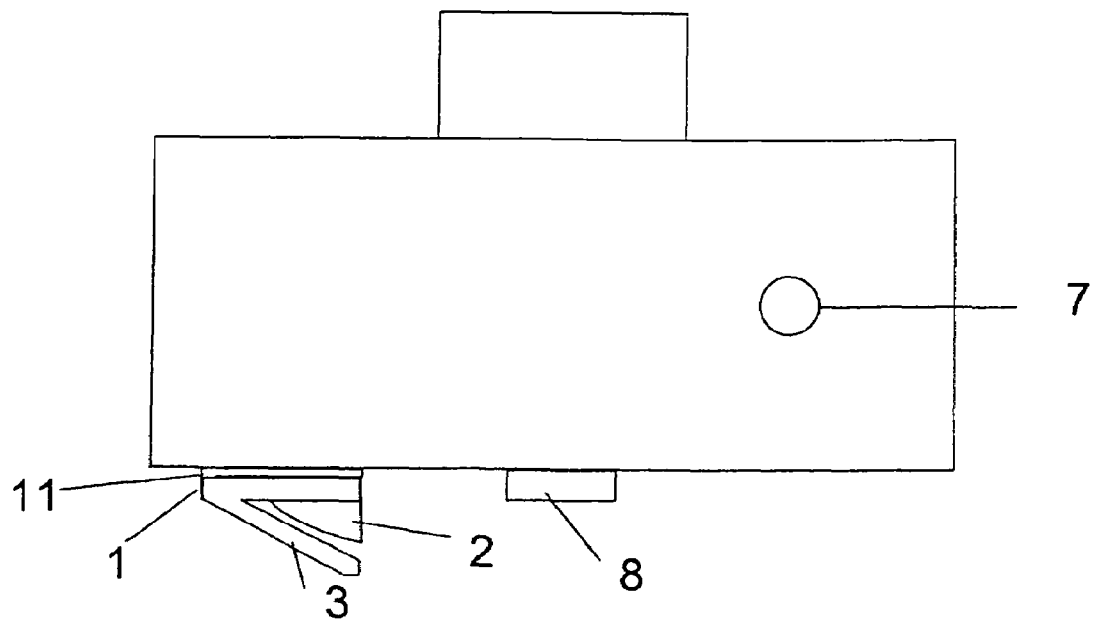
FIGS. 5(a) and 5(b) are views illustrating the conditions that the nose pad is attached to a single lens reflex type camera and a rangefinder type camera, respectively.

Hereinafter, preferred embodiments of the invention will be explained with references to the accompanying drawings.

FIG. 1 is a front view of a nose pad, and FIG. 2 is a rear view of the nose pad, shown in FIG. 1.

As shown FIGS. 1 and 2, the embodiment of the invention basically includes a base plate 1, a projecting portion 2 which is designed to fit a contour of a nose and a sheet portion 3. The base plate 1 has a rectangular flat shape to be attached to an outer surface of a camera.

In the present invention, the projecting portion 2 can be separately formed and bonded onto the base plate, or integrally formed with the base plate 1 as one unit. In FIGS. 1-7, the one unit type of nose pad is employed, even though each of FIGS. 1-7(b) has a line, separating the base plate 1 and the projecting portion 2 for better understanding. An illustration for an embodiment of the separately formed projecting portion bonded to the base plate is omitted since it would be substantially same as FIG. 2 in terms of a structure of the projecting portion 2 and the base plate 1.

Specifically, as shown in FIG. 2, the projecting portion 2 has an arc shape so that a center area is the most elevated and highest point 6 from a base plate 1 surface among other portions of the projecting portion 2. The highest point 6 of the projecting portion 2 is designed to be slightly closer to one side edge of the base plate 1 than an opposite side edge thereof. This line of the projecting portion 2 enables the nose pad to fit a contour of the nose. Accordingly, when the nose pad is attached to a camera, unnecessary movement between the user and the camera can be avoided.

FIG. 3 is a view of the nose pad from an upright angle against the base plate 1 shown in FIG. 1. A broken line shows an end line of the projecting portion 2 under the sheet 3 portion. As shown in FIG. 3, the highest portion 6 (corresponding to the widest portion in FIG. 3) of the projecting portion is designed to be closer to one side edge thereof.

In this embodiment, the sheet portion 3 extends obliquely upwardly from one side of the base plate 1 over the projecting portion 2 and the base plate 1, and has a reasonable space in between the sheet portion 3 and the projecting portion 2 in order for the sheet portion 3 to touch a nose softly and serve as a cushion. In order words, the sheet portion 3 has a function to spread a pressure arising in between a nose and the projecting portion 2 of the nose pad by exactly fitting a contour of a nose and filling the space in between the nose and the projecting portion 2 of the nose pad. In this embodiment, the upper edge of the sheet portion 3 is longer than an edge of the base plate 1 so that the sheet portion 3 can effectively cover an entire projecting portion 2 of the nose pad.

In the invention, the nose pad is preferably molded integrally as one unit by a soft and flexible material. Resin, rubber, foamed material and so on may be used. The base plate 1 and the sheet portion 3 may be integrally formed, and the projecting portion 2 may be attached to the base plate 1.

FIG. 4(*a*) is a side view of the nose pad, wherein the sheet portion 3 is directly fixed to the base plate 1, and FIG. 4 (*b*) is a side view of the nose pad with a vertical connecting portion 5. The vertical connecting portion 5 is provided to secure more space in between the sheet portion 3 and the projecting portion 2 in order to enhance functionalities of the nose pad.

As shown in FIGS. 4(*a*) and 4(*b*), the projecting portion 2 is designed to curve downward to the connecting edge of the base plate 1 and the sheet portion 3. Also, there is a margin from the connecting edge of the base plate 1 and the sheet portion 3 to the end line of the projecting portion 2 to secure reasonable space between the sheet portion 3 and the projecting portion 2, as shown by double broken lines. The sheet portion 3 can be easily bent onto the projecting portion 2.

Figure 5B:
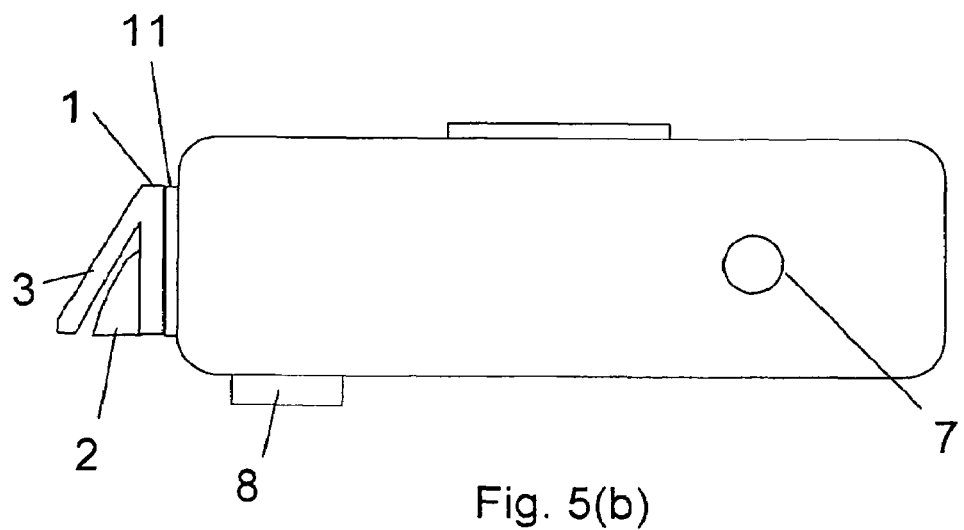

FIGS. 5(*a*) and 5(*b*) are views illustrating how the nose pad can be attached to a single lens reflex type camera and a rangefinder type camera through an adhesive 11, respectively. The nose pad can be set in such a way that the nose pad fits the contour of a nose. In FIGS. 5(*a*) and 5(*b*), a shutter 7 and finder 8 are also shown for better understandings regarding how the nose pad can be attached to two major types of cameras.

Figure 6A:
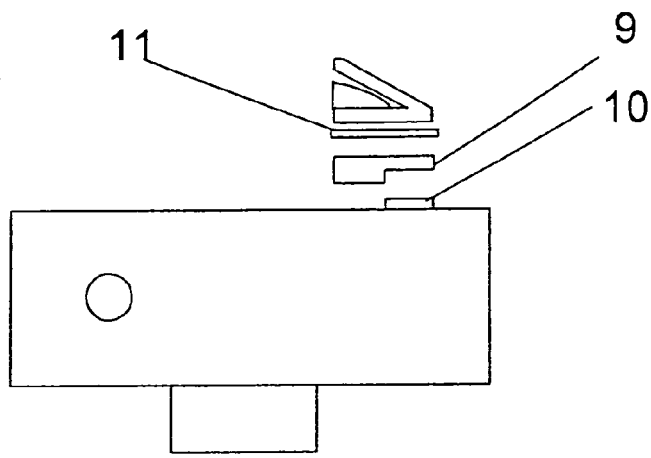
FIGS. 6(a) and 6(b) are views illustrating the conditions that the nose pad is attached to the camera through an adapter.
Figure 6B:
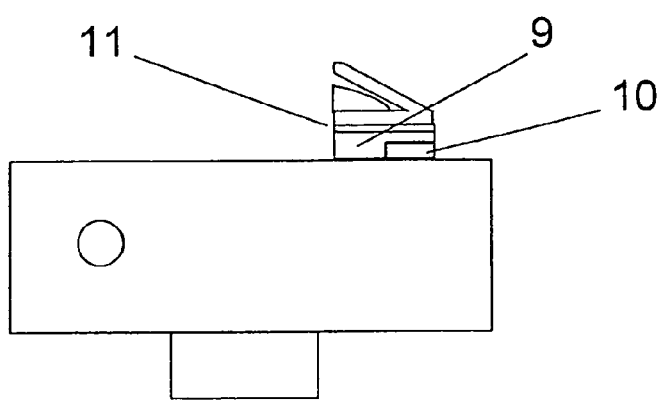
Figure 7B:
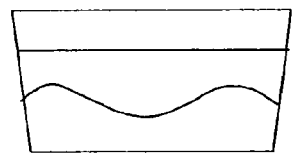

FIGS. 6(*a*) and 6(*b*) are views illustrating how the adapter 9 can be attached to a projecting surface 10. The adapter has a shape corresponding to the base plate 1, but a step portion covering the projecting surface 10 is formed at a lower side thereof. The adapter 9 is attached to the nose pad by the adhesive 11, and the adapter 9 is attached to the camera by an adhesive (not shown). FIG. 6(*a*) is a view before the nose pad with the adapter 9 is attached to the camera. FIG. 6(*b*) is a view after the nose pad with the adapter 9 is attached to the camera.

Figure 7A:
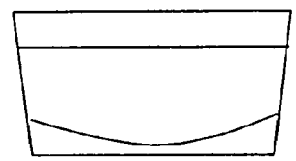
FIGS. 7(a) and 7(b) are views illustrating possible variations of projecting portions.

FIGS. 7(*a*) and 7(*b*) show variations concerning the projecting portion 2 for different nose lines. FIG. 7(*a*) shows an example where a depression portion is employed and mounted instead of the projecting portion 2. FIG. 7(*b*) shows an example where a wave like portion is employed and mounted instead of the projecting portion 2. The projecting portion 2 may have shapes other than those shown in the application. Also, the base plate 1 and the sheet portion 3 have a rectangular shape, but the base plate and the sheet portion 3 may have any shape, such as, circular, half circular, combination of rectangular shape and other shape.

While the invention has been explained with references to the specific embodiments of the invention, the explanation is illustrative and the invention is limited only by the appended claims.

What is claimed is:

1. A nose pad to be attached to a camera, comprising;
   a base plate,
   at least one projecting portion formed on the base plate, and
   a sheet portion attached to an edge of the base plate to extend obliquely upwardly over the projecting portion and the base plate.

2. A nose pad according to claim 1, wherein the projecting portion has an arc shape, and a highest point from a base plate surface located closer to one side edge thereof.

3. A nose pad according to claim 1, wherein the sheet portion has a flexibility to spread a pressure applied thereto over the projecting portion of the nose pad and is arranged to form a space relative to the projecting.

4. The nose pad according to claim 1, further comprising an adhesive on a backside of the base plate to be attached to the camera.

5. The nose pad according to claim 1, further comprising an adapter on a backside of the base portion.

6. The nose pad according to claim 1, wherein the projecting portion is separately formed and bonded with the base plate and the sheet portion.

7. The nose pad according to claim 1, wherein the sheet portion has a vertical connecting portion between the base plate and the sheet portion.

8. The nose pad according to claim 1, wherein the projecting portion is firmer than the sheet portion.

9. The nose pad according to claim 1, wherein the nose pad is made of silicon, silicon sponge.

* * * * *